United States Patent [19]

Franz

[11] 4,346,729
[45] Aug. 31, 1982

[54] TEMPERATURE CONTROL SYSTEM AND PUSHBUTTON CONTROLLED PNEUMATIC ACTUATOR

[75] Inventor: Rudolph J. Franz, Schaumburg, Ill.
[73] Assignee: Eaton Corporation, Cleveland, Ohio
[21] Appl. No.: 43,291
[22] Filed: May 29, 1979
[51] Int. Cl.³ .................... H01H 3/04; F16K 11/02
[52] U.S. Cl. ........................ 137/353; 137/625.11; 91/48; 165/31; 165/42
[58] Field of Search ............ 137/353, 595, 624.14, 137/625.11; 91/47, 48, 357; 165/31, 42

[56] References Cited

U.S. PATENT DOCUMENTS

| | | | |
|---|---|---|---|
| 3,156,157 | 11/1964 | Smith et al. | 91/48 |
| 3,408,899 | 11/1968 | Golden | 91/357 |
| 3,502,110 | 3/1970 | Ogilvie | 137/625.11 |
| 3,657,966 | 4/1972 | Campbell | 91/357 |
| 3,983,930 | 10/1976 | Franz | 165/31 |
| 4,083,290 | 4/1978 | Andres | 91/357 |
| 4,126,153 | 11/1978 | Raab | 137/353 |

Primary Examiner—Albert W. Davis
Assistant Examiner—Margaret A. Focarino
Attorney, Agent, or Firm—C. H. Grace; R. A. Johnston; J. G. Lewis

[57] ABSTRACT

A temperature control system including a pushbutton controlled, pneumatically operated actuator for controlling a vehicle heating and air conditioning system is disclosed. A plurality of pushbutton operated valve assemblies (112) enables an operator to control the system by selectively communicating a vacuum source connected to each valve member to a given position within a vented air-piston chamber (72). A piston (74), slidably received in the chamber, is moved along the chamber by the differential pressure across the piston face until a seal member (76) located around the piston periphery blocks the orifice of the passageway (68) communicating with the vacuum source, thus substantially sealing off the chamber from the vacuum source and preventing further piston movement. The number of output positions of the actuator piston in one embodiment of the invention is equivalent to the number of pushbutton valves which communicate the vacuum source to the air chamber. Piston movement is used to control actuation of associated heating and air conditioning system components.

2 Claims, 14 Drawing Figures

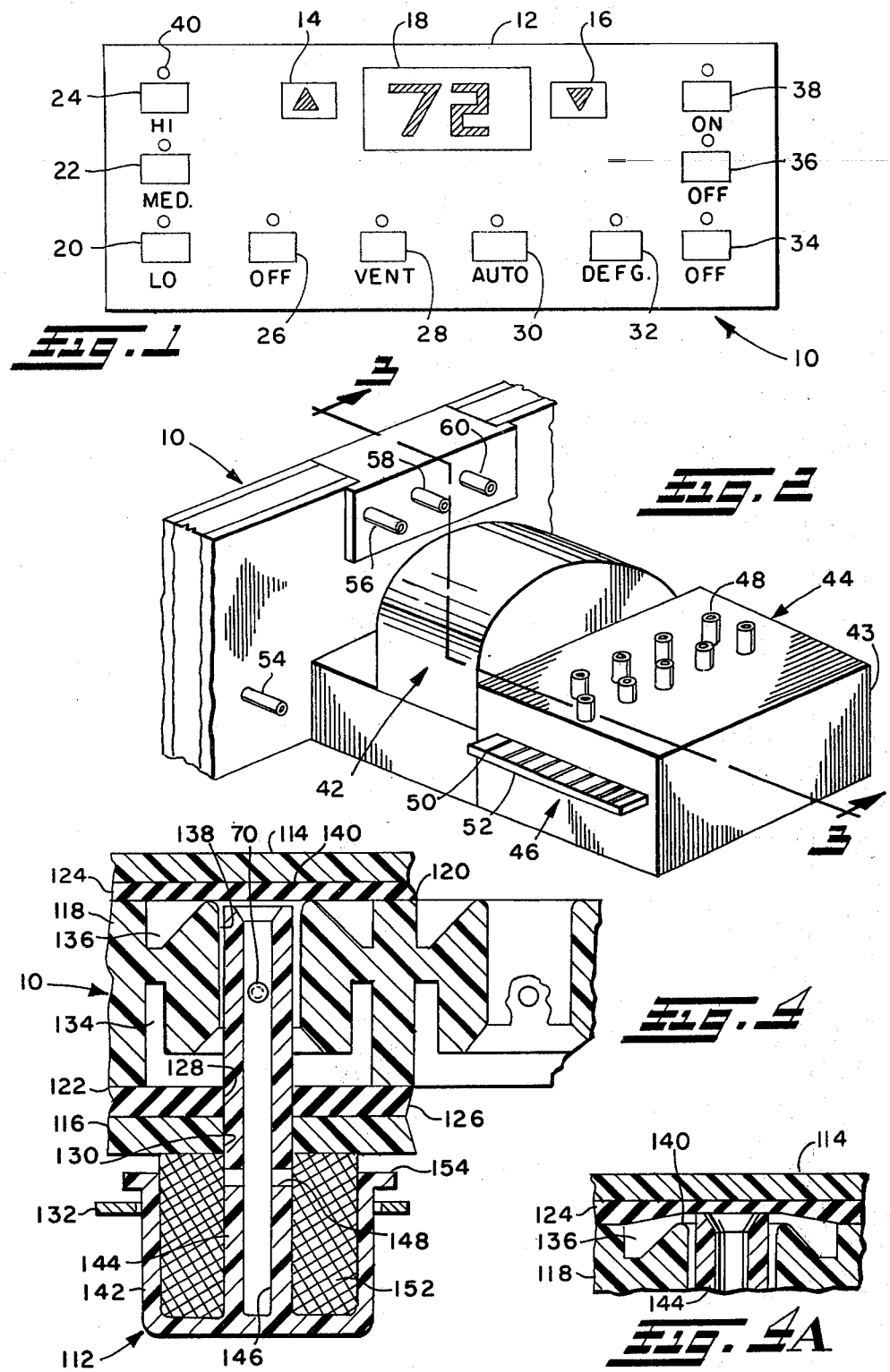

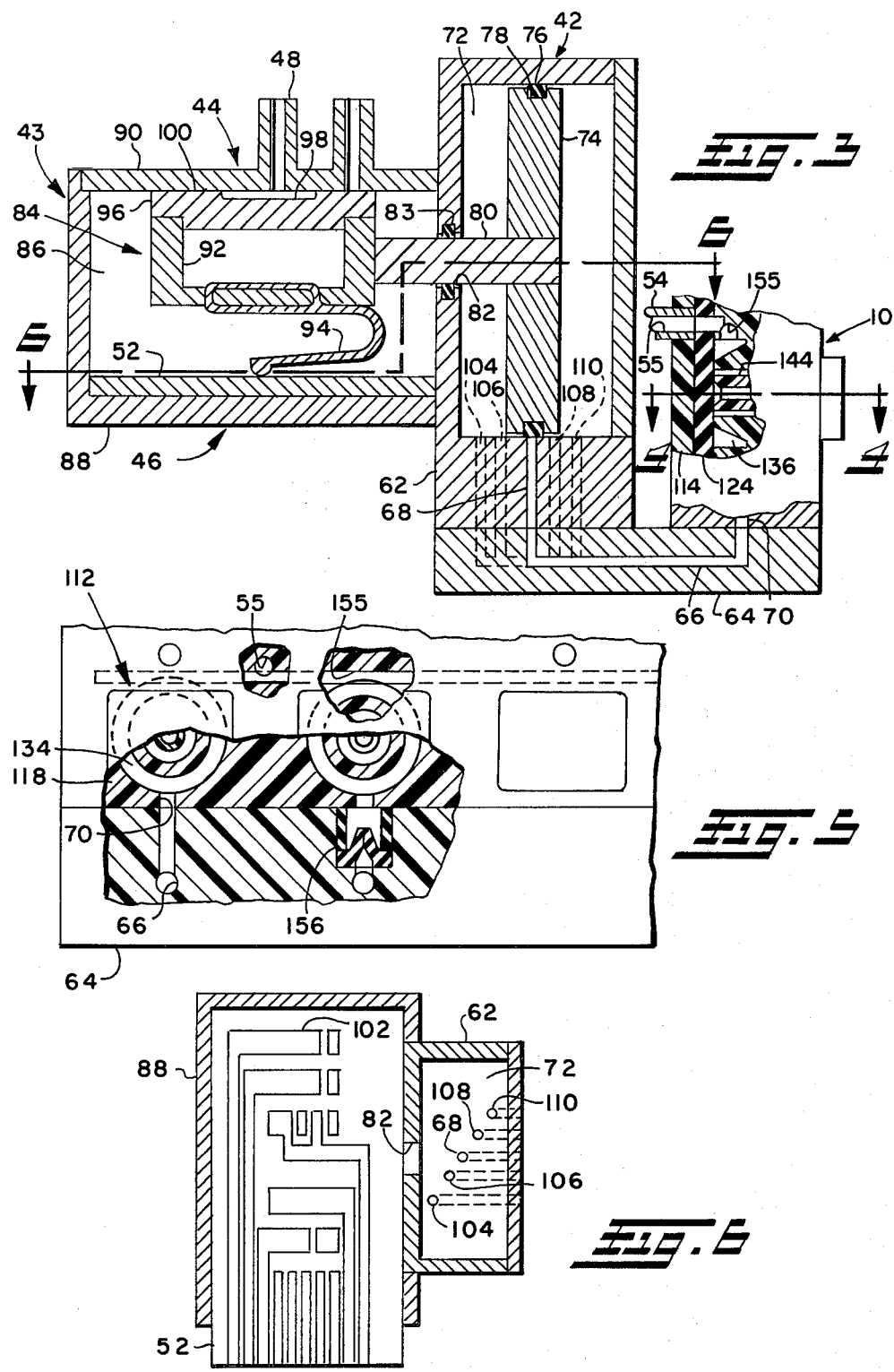

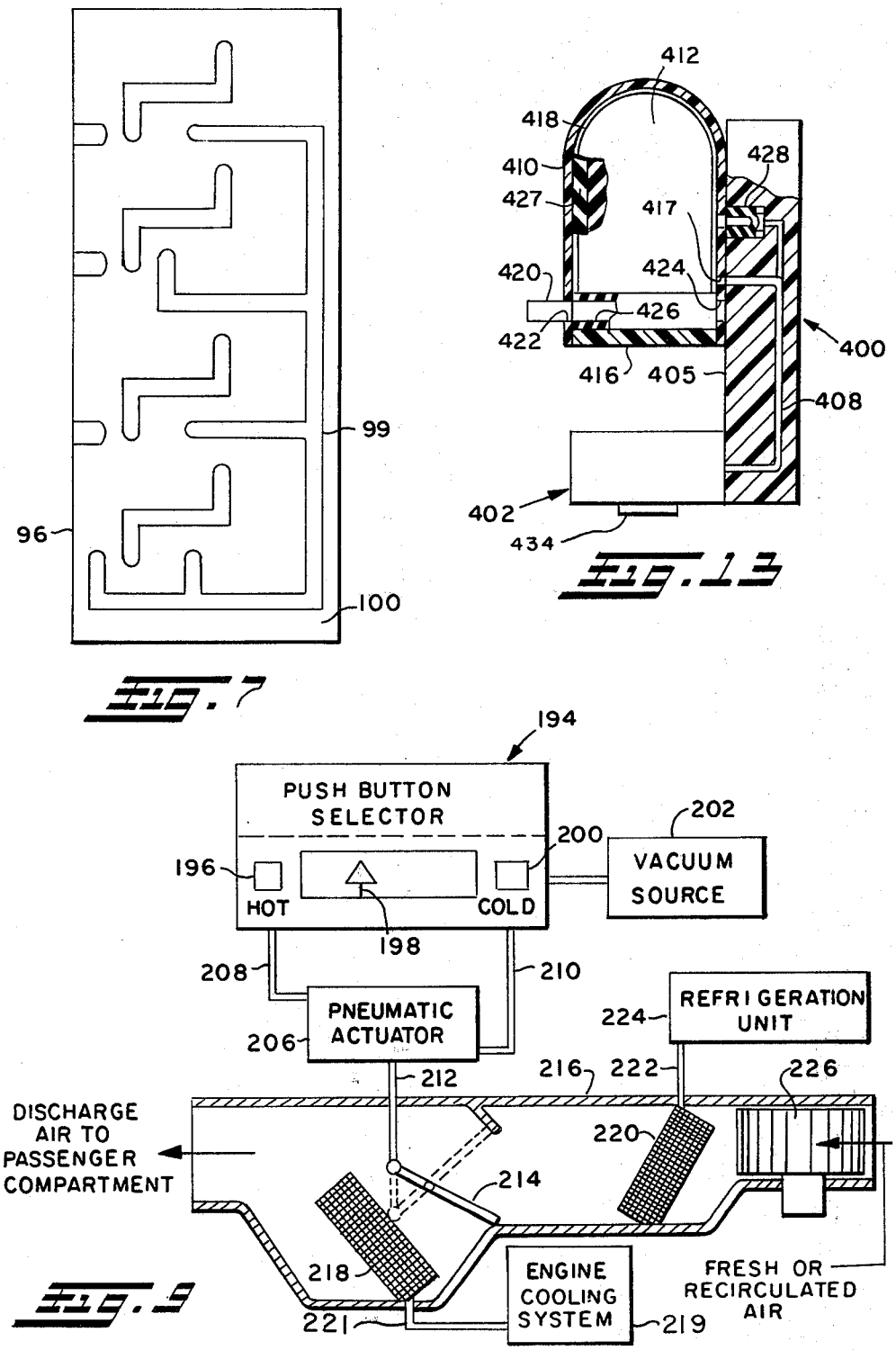

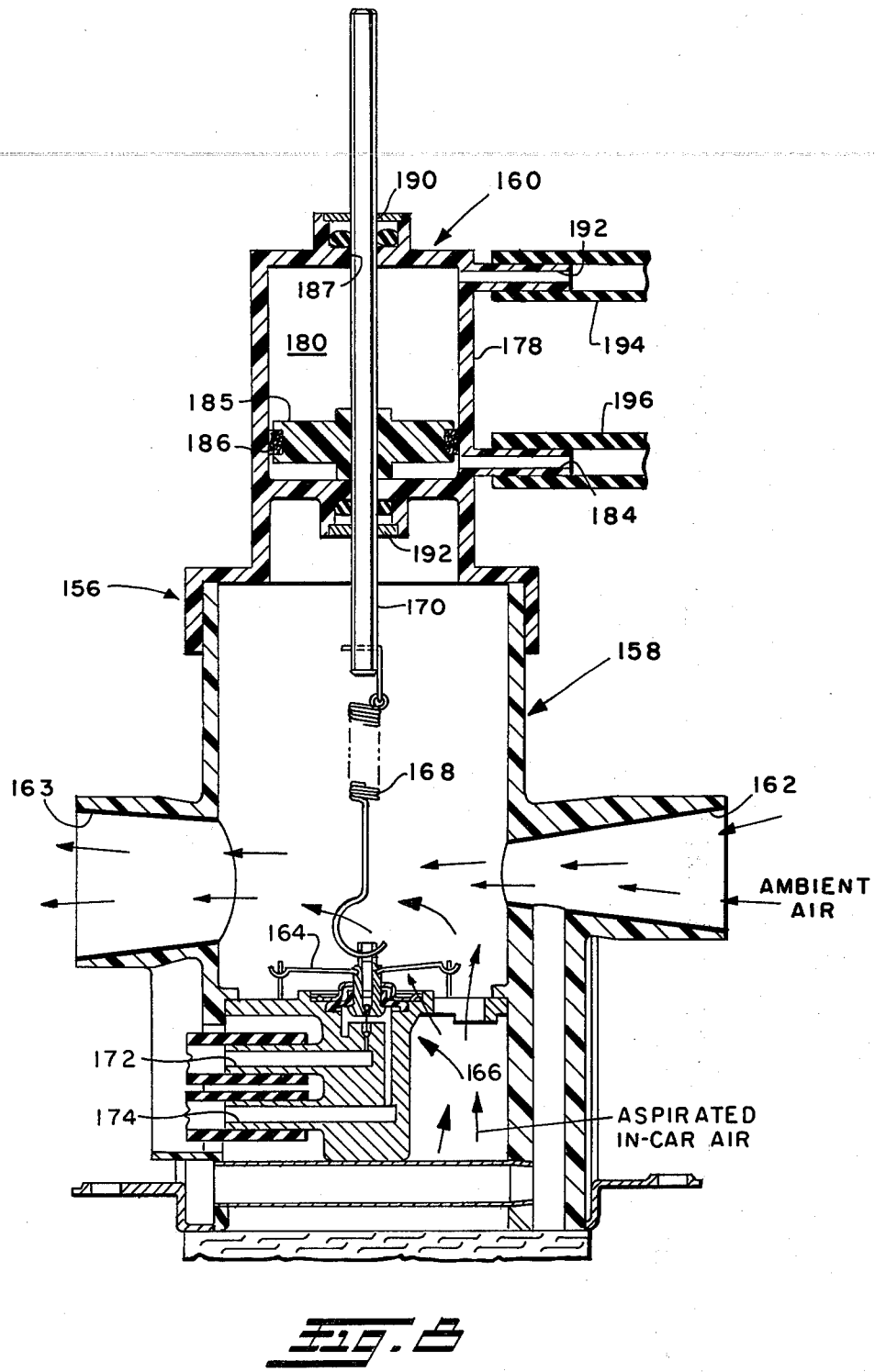

TEMPERATURE CONTROL SYSTEM AND PUSHBUTTON CONTROLLED PNEUMATIC ACTUATOR

FIELD OF THE INVENTION

This invention is directed to automatic control systems for controlling the temperature of a vehicle passenger compartment.

The system includes a novel pushbutton controlled, pneumatically operated actuator which may also be used in other pneumatic and electrical control systems for other applications.

DESCRIPTION OF PRIOR ART

Presently known automatic temperature control systems for passenger vehicles usually have an operator actuated control lever for selecting the operating mode, for example heating, cooling or defrost. In these systems passenger compartment temperatures are selected by moving an operator controlled selector knob to a particular visually indicated position. In such systems of the type described there has been a need to further simplify the operator function selection by eliminating the driver distraction dwell time required to visually confirm the lever or knob position, even where detents are employed. Pushbutton controls offer a convenient means of actuation and one which minimizes driver-operator distraction. Other factors contributing to the desirability of pushbutton controls can be attributed to aesthetics and styling uniformity of automotive control panels.

In the more widely used types of vehicle automatic temperature control systems, the actuators for moving the various control function servos such as the blend-air door servo are pneumatically and usually vacuum operated. Vacuum actuators have become widely used in such systems, generally because of their low cost and ease of manufacture and installation. Where an operator actuated control lever or knob is employed for system control function or temperature selection, the lever or knob is usually connected to a vacuum diverter valve or modulator valve for energizing or biasing the modulation of selected control function servos.

Where it is desired to replace the operator actuated lever or knob with pushbuttons, it has been found quite difficult to provide a means for precisely positioning of a vacuum diverter or modulator valve with pushbutton actuators. The problem is further complicated where it is desired to provide electrical signal indication of the system function mode, or electrical indication of the system control bias setting where vacuum or pneumatic servos are employed. It has been particularly troublesome to provide a low cost technique for interfacing such button actuators in a vacuum or pneumatic servo control system where electrodigital indications are desired of system function mode, instantaneous state and selected or desired setting.

SUMMARY OF THE INVENTION

An automatic heating and air conditioning system is provided having a pushbutton controlled, pneumatically operated actuator for selecting various system operating functions. The invention system offers the simplicity of operation afforded by pushbutton controls together with the proven reliability of a pneumatically or vacuum controlled automatic temperature control system.

The invention system includes a novel pushbutton actuated, pneumatically operated actuator having a plurality of linear position outputs defined by a piston which is slidably received in an air cylinder. Air bleed passages on either end of the air cylinder function to communicate atmospheric air pressure to the space on each side of the piston. The linear output positions of the piston are determined by the piston seal seeking a null point relative to one of the inlet ports which are open into the cylinder wall and which are each in fluid communication with a corresponding one-way pneumatic valve. The transverse dimension of each orifice is slightly less than the width of the piston seal. The different output positions of the piston are attained by actuating one of the one-way valves thereby communicating the space on one side of the piston with a vacuum source and creating a sudden pressure differential across the piston face. The differential pressure moves the piston until the piston seal aligns with the next adjacent orifice, thereby blocking further air flow from the cylinder to the vacuum source. The air pressure on either side of the piston is then equalized by flow through the bleed holes. The number of output positions that the piston can achieve is determined by the number of valved orifices provided along the air cylinder wall. Upon application of vacuum to one of the valved ports, where the ports are sized to provide nearly instantaneous evacuation of atmospheric air in the cylinder to the vacuum source and where the moving parts are kept low in inertia, and the frictional drag of the piston seal against the cylinder wall is kept low, movement of the piston is thus relatively fast.

The piston is preferably connected to a control rod which provides a direct mechanical force and position output from the piston. In the presently preferred practice the control rod is connected to a slider member which has a set of switch contacts on one side thereof which make contact with a printed circuit board for providing electrical signal indicative of piston position. The slider also includes means defining valving surfaces operable to provide valving functions for selectively interconnecting individual stationary fluid ports to provide fluid communication to external fluid control circuits. Selective actuation of any one of the pushbuttons causes the piston to move to a specific position resulting in a different combination of electrical contacts being either closed or opened and also a different combination of output ports being communicated with a vacuum source or vented to atmospheric pressure. Thus, a desired set of vacuum control signals may be provided to various vacuum actuated servo motors. These motors may be connected to control associated systems components such as water valves and air blend doors for modulating air flow to a heater or evaporator core and distributing tempered air to various locations within the vehicle. In a similar manner, movement of the switches along the printed circuit may be used to control the operation of electrically driven components such as the air blower motor, air conditioning compressor clutch switch, etc.

In one embodiment of the invention pushbutton actuated, pneumatically operated piston arrangement is interfaced with a set-point temperature selector element located within an automatic temperature control (ATC) sensor. The set-point temperature selector permits the operator to provide a reference input to the sensor for the desired passenger compartment temperature. The output rod of the piston is connected to an adjustable preload and bias element of the ATC sensor for establishing the set-point temperature. In such an arrangement two pushbuttons are utilized, one for increasing and the other for decreasing the set-point temperature, thus providing an infinitely controllable temperature selection between minimum and maximum limits. A visual readout of the selected temperature is provided preferably electrically to enable the operator to make a precise adjustment.

Another feature of the invention is a pressure responsive fail safe switch which automatically places the system into the heating and defrost mode upon loss of system vacuum, whether due to vacuum reservoir failure, vacuum line failure, or other causes.

It is therefore an object of the present invention to provide a pushbutton controlled automatic temperature control system for controlling the temperature of a passenger compartment.

It is another object of the present invention to provide a pushbutton controlled automatic temperature control system having vacuum operated servo motors.

It is another object of the invention to provide a pushbutton controlled pneumatically operated actuator operable to provide precise position output control signals.

It is another object of the invention to provide a pushbutton controlled pneumatically operated actuator which is simply constructed and easy to maintain and service.

Another object of the invention is to provide a pushbutton controlled pneumatically operated temperature control system which has a fail safe mode which automatically places the system into a high heat defrost function.

BRIEF DESCRIPTION OF THE DRAWINGS

FIG. 1 is a schematic representation of a pushbutton control panel;

FIG. 2 is a perspective view of the pushbutton controlled pneumatically operated actuator shown in association with a vacuum programmer and an electrical programmer;

FIG. 3 is a cross-sectional view through a portion of the pushbutton control panel taken along section indicating lines 3—3 in FIG. 2 illustrating a connecting passage to a pneumatic actuator having an output rod connected to a slider member for controlling vacuum and electrical programmers;

FIG. 4 is a cross-sectional view taken along section indicating lines 4—4 of FIG. 3 showing details of a typical pushbutton actuated pneumatic valve assembly;

FIG. 4A is a partial view similar to FIG. 4 illustrating the pneumatic valve in the open position;

FIG. 5 is a front view of a pushbutton control panel illustrating three buttons typical of those of the embodiment of FIGS. 1 and 2 and which are shown in partial cross-section, illustrating the output passageways therefrom and also a one-way pneumatic check valve associated with the intermediate pushbutton valve;

FIG. 6 is a cross-sectional view taken along section lines 6—6 of FIG. 3 illustrating a printed circuit board of the electrical programmer and also the location of fluid ports in the actuator cylinder chamber;

FIG. 7 is a top view of the vacuum programmer slider member of FIG. 3 illustrating an array of interconnecting fluid passageways;

FIG. 8 is a cross-sectional view through an automatic temperature control sensor having a pushbutton actuated, pneumatically operated set-point temperature adjustment;

FIG. 9 is a schematic illustration of a pushbutton actuated, pneumatically operated temperature control system;

FIG. 13 is a partial cross-sectional view taken along section indicating lines 13—13 of the embodiment of FIG. 12 and illustrating the connecting passageways between the pushbuttons and the actuator chamber.

DETAILED DESCRIPTION

Figure 10:
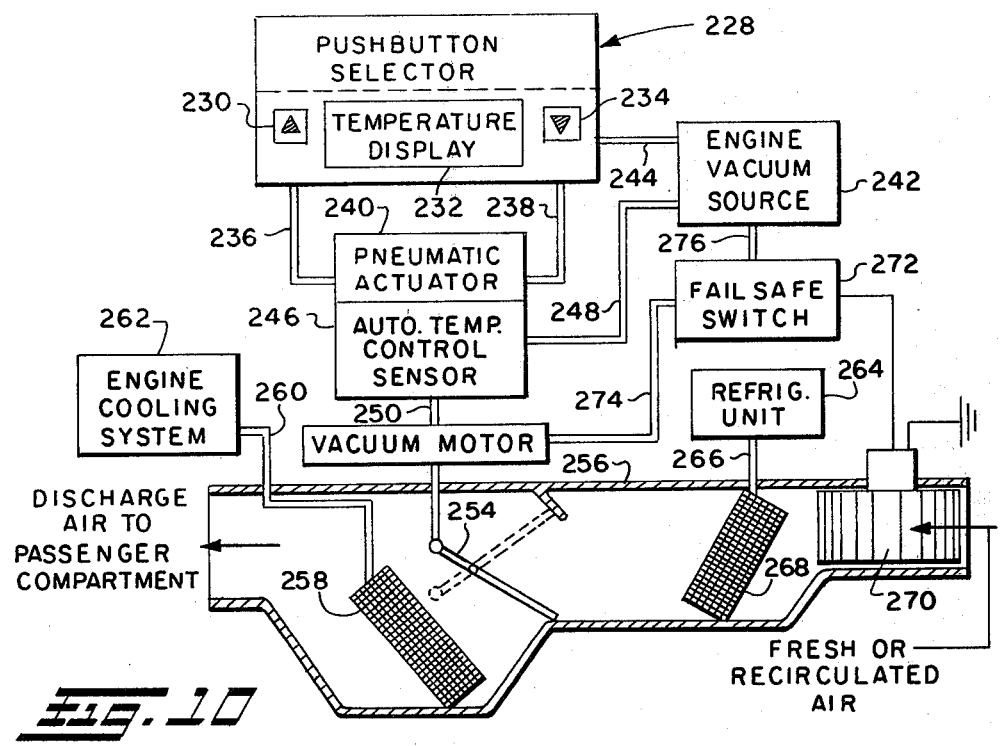
FIG. 10 is a schematic illustration of a pushbutton actuated, pneumatically operated automatic temperature control system having a fail safe electro-pneumatic switch.

Referring now to FIG. 1, there is indicated generally by reference numeral 10 a pushbutton control panel of the present invention. Panel 10 includes all of the required operating functions for completely controlling an automatic temperature control system. Panel 10 has a temperature selection display, indicated generally by reference numeral 12 comprising a temperature increase pushbutton 14, a temperature decrease pushbutton 16, and a digital temperature display 18 which provides a visual feedback to the operator of the desired passenger compartment set-point temperature entered into the system. Selector 12 produces a pneumatic signal which is transferred to an associated system component as will be described subsequently in greater detail.

Pushbuttons 20, 22, and 24 are aligned vertically on the left side of panel 10 and function to control blower speed. Pushbuttons 26 through 34 are aligned horizontally along the lower portion of the panel and function to control and place the automatic temperature control system of the present invention into specific operating modes designated beneath each button.

Pushbuttons 36 and 38 control a rear window defog blower motor. An indicator light 40 is located above each pushbutton for indicating to the operator when each command signal has been completed. It will be understood that the pushbuttons may be illuminated as, for example, by fiber optics, upon completion of the command signal in place of separate indicator lights 40.

Referring now to FIG. 2, a section of the back side of control panel 10 is illustrated showing the relative positions of a pneumatic actuator indicated generally at 42 as interfaced with control panel 10 and a housing indicated generally at 43 which contains a vacuum programmer 44 and an electrical programmer 46. A plurality of nipples 48 extend upwardly from the top surface of housing 43 each having a port therein which functions to transfer the output from vacuum programmer 44 to associated pneumatically operated system components, not shown. Contact strips 50 printed on circuit board 52 transfer the output from electrical programmer 46 to associated electrically operated system components.

A nipple 54 extends from the lower side of panel 10 and is connected to a vacuum source, not shown, for communicating vacuum to pushbuttons 26 through 34.

Nipples 56, 58 and 60 are associated with temperature selection display 12. Nipple 58 is connected to a vacuum source while nipples 56 and 60 transfer a pneumatic signal to an automatic temperature control sensor, which will be hereinafter described in greater detail.

Referring now to FIG. 3, a portion of control panel 10 is shown in partial cross section along with details of one embodiment of a novel pneumatic actuator 42, vacuum programmer 44, and electrical programmer 46. Actuator 42 includes a housing 62 mounted on a manifold block 64 which interconnects actuator 42 with control panel 10. A passageway 66 extends through manifold block 64 and has one end thereof in fluid communication with a vertical passageway or port 68 in housing 62 and an outlet passageway 70 located in control panel 10.

Pneumatic actuator 42 includes a cylindrical chamber 72 defined by the internal surface of housing 62 in which is slidably received a piston 74. A piston seal 76 is mounted in an annular groove 78 formed around the outer periphery of piston 74 and functions to fluidly isolate the space on either side of the piston. An output control rod 80 has the right end thereof in FIG. 3 connected to piston 74 and the other end thereof extending through an opening 82 in housing 62. A seal ring 83 sealingly engages with the periphery of rod 80 and an annular groove concentric with opening 82 for fluidly isolating chamber 72 at that interface.

The output or left end of rod 80 in FIG. 3 is connected to a slider assembly, indicated generally by reference numeral 84. Slider assembly 84 is contained within a chamber 86 defined by housing 43 which is comprised of a lower section 88 and an upper housing plate 90. Slider assembly 84 includes a channel shaped member 92 connected to the left end of control rod 80. A pair of flexible switch contacts 94, only one of which is shown by FIG. 3, are connected to member 92 for movement therewith and are engageable with contact strips 50 of board 52.

A vacuum slider member 96 is connected to channel member 92 and is formed of a suitable resilient material for sealingly engaging with the bottom surface of plate 90. As shown by FIG. 7, vacuum slider 96 has an array of grooves 98 formed into its top surface 100 which function to distribute vacuum signals between various combinations of nipples 48 as will be described subsequently in greater detail.

Printed circuit board 52 is mounted on the upper surface of lower section 88 and, as shown by FIG. 6, has a plurality of printed contacts 102 located on the top surface thereof. A portion of printed circuit board 52 extends exteriorly of housing 43 and provides a means for electrically connecting the contact strips 50 to associated electrically operated components in the temperature control system.

With reference to FIGS. 3 and 6, fluid ports 104, 106, 108, and 110 are shown as being in fluid communication with cylindrical chamber 72 and are longitudinally spaced therealong. Fluid ports 104, 106, 108, and 110 are fluidly communicated to specific locations within control panel 10 by means of passageways comparable to passageways 68, 66, and 70 and which are partially shown by the dashed lines of FIG. 3 and 6.

As is shown by FIG. 3, the width of piston seal 76 should be slightly greater than the diameter of port 68, and 104 through 110. In the preferred form of the invention the orifice diameters of end ports 104 and 110 are 0.030 inch (0.762 mm), the orifice diameters of intermediate ports 68, 106, and 108 are 0.040 inch (1.024 mm), seal 76 has a width of 0.050 inch (1.270 mm), and piston 74 has a diameter of 1.00 inch (2.54 cm).

Referring now to FIGS. 4 and 5, a typical one of the pushbutton valve assemblies, indicated generally by reference numeral 112, is shown installed through control panel 10. Control panel 10 is shown as including a rear mounting plate 114, a front mounting plate 116, and a manifold body 118 sandwiched therebetween. Manifold body 118 includes a rear sealing surface 120 and a front sealing surface 122. A rear sealing gasket 124 is located intermediate rear mounting plate 114 and sealing surface 120. Sealing gasket 124 also functions as a flexible valve member as will be hereinafter described in greater detail. A front sealing gasket 126 is located intermediate front sealing surface 122 and front mounting plate 116 and has formed therein an opening 128 which is coaxial with a comparable opening 130 in mounting plate 116. A face plate 132 completes the control panel construction. Panel 10 is fastened together by any suitable means permitting easy disassembly if maintenance is required.

Manifold body 118 has a first annular passageway 134 which opens into front sealing surface 122 and a second annular passageway 136 which opens into rear sealing surface 120. A central passageway 138 is coaxial with annular passageways 134 and 136 and extends across the transverse thickness of manifold body 118. An annular valve seat 140 is defined by a portion of rear sealing surface 120 intermediate passageway 136 and central passageway 138 and is normally held in sealing engagement with rear sealing gasket 124 which functions as a flexible valve member for fluidly isolating the spaces defined by those respective passageways.

Pushbutton assembly 112 includes a cup-shaped button portion 142 having molded integrally therewith a stem portion 144 which is also designated as a valve member. Stem 144 extends through openings 128 and 130, and is slidably received in central passageway 138. The outer periphery of stem 144 is in sealing engagement with opening 128 in gasket 126 thereby preventing atmospheric air from entering annular chamber 134 between those surfaces. Stem 144 is tubular and defines a central passageway 146 and a transverse passageway 148 adjacent the button end of pushbutton assembly 112. As best shown in FIG. 5, annular passageway 134 is in fluid communication with pushbutton outlet fluid passageway 70 (see FIG. 3). Returning now to FIG. 4, passageway 70 is shown by the dashed circle and an annular filter element 152 is shown received over stem 144 and seated within cup shaped button portion 142. Filter element 152 has a longitudinal thickness sized for locating the free end of stem 144 a predetermined distance from the face of rear sealing gasket 124. Filter material 152 is also resilient, thereby enabling it to act as a return spring for pushbutton assembly 112. A flange 154, formed around the peripheral edge of cup-shaped button 142, has a transverse outer dimension which overlaps the opening in face plate 132 for preventing removal of the pushbutton from the control panel.

Immediately adjacent the FIG. 4 structure thus far described is another set of identical passageways in manifold body 118 for the next adjacent pushbutton assembly. The structure thus shown is repeated for each successive pushbutton assembly as shown by FIG. 1.

Referring to FIG. 5, a portion of manifold body 118 has been broken away to show the position of passageway 70.

A vacuum source, not shown, is communicated through an opening 55 in nipple 54 (see FIG. 1) which has a fluid port extending through rear mounting plate 114, gasket 124, and into a portion of manifold body 118 with reference to FIG. 4. A fluid passageway 155 (see FIGS. 3 and 5) extends along the length of manifold body 118 and intersects each adjacent annular passageway 136, thereby placing those spaces in communication with the vacuum source. For the pushbutton position shown by FIG. 4, the pushbutton is in the closed or unactuated position and atmospheric air is communicated to passageway 134 by following a path through filter 152, transverse passageway 148, through the stem central passageway 146, past the axial space between gasket 124 and the free end of stem 144, through the radial space between the outer periphery of stem 144 and the internal wall of central passageway 138 and into annular passageway 134. As shown by FIG. 5, passageway 134 is in fluid communication with passageway 70, thus communicating atmospheric air also to passageways 66 and 68 (FIG. 3).

In operation, piston 74 of pneumatic actuator 42 can be selectively positioned along cylindrical chamber 72 to any one of the five positions defined by the longitudinal spacing of fluid ports 104, 106, 108, 110, and 68 (Ref. FIG. 6) by depressing the pushbutton corresponding to that fluid port. The total number of output positions of the piston 74 is a function of the number of pushbuttons and the location of its outlet fluid passageway relative to the cylinder chamber 72.

Upon manually depressing button portion 142 of pushbutton assembly 112 (see FIGS. 4 and 5), the free end of stem 144 initially sealingly engages with gasket 124 thereby blocking further atmospheric air communication through stem 144 and into passageway 134. As stem 144 moves further, flexible gasket 124 is lifted from valve seat 140, which permits the air, at atmospheric pressure in passageway 134, to exhaust through passageway 138, into passageway 136, and finally to the vacuum source by means of the passageway 155 and port 55 in nipple 54. Since chamber 134 is fluidly in communication with the space on one side of piston 74, the atmospheric air in that particular portion of cylindrical chamber 72 is also evacuated through the path described above. As the atmospheric air is evacuated from one side of the piston 74, the differential pressure existing thereacross moves the piston.

It should be noted that in those applications which require three or more pneumatic actuator output positions, a one-way check valve indicated generally at 156 in FIG. 5 must be located between the pushbutton outlet fluid passageways (70) and the ports (68 and 104-110) which communicate with the actuator cylinder in order that excessive atmospheric air pressure is not vented into the chamber. In the presently preferred practice, the check valve is of a type commonly referred to as a "duckbill valve", but any suitable type may be employed. However, the two pushbutton assemblies which communicate with the outermost orifices (corresponding to 104 and 110 of FIG. 3) must not have a check valve along their outlets since they provide atmospheric air venting into chamber 72 while in the unactuated or closed position.

In operation, a pressure differential will exist across piston 74 until piston seal 76 slides over and substantially blocks off the orifice through which air in chamber 72 has been evacuated. Thus the piston seeks the position of the orifice through which air is being evacuated in response to actuation of a selected pushbutton to achieve repeatable indexing motion of the piston. The width of piston seal 76 should be approximately equal to the transverse dimension of each of the fluid ports which enters chamber 72.

To move piston 74 to another position, a pushbutton having an outlet passageway in fluid communication with chamber 72, and not already blocked by piston seal 76 is depressed permitting atmospheric air on that side of the piston to evacuate to the vacuum source, again setting up a differential pressure which moves the piston into alignment with an evacuating orifice until seal 76 blocks the escape of air through the orifice which is in fluid communication with the outlet passageway of the pushbutton.

In the five-pushbutton actuator shown by FIG. 3, it will be necessary to incorporate a one-way check valve along the three intermediate ports (106, 68, and 108) in order to prevent excessive atmospheric air venting into chamber 72. In the preferred form of the invention the width of piston 74 is sized relative to the positions of the outermost fluid ports (104, 110) so that when the piston abuts against the end walls of chamber 72, seal 76 is prevented from sealing off the outermost ports adjacent the end wall. By sizing the piston width relative to the position of the outermost ports which enter into the piston chamber in this manner, the repeatability of the end positions of the piston is insured. Also a more positive return venting is achieved after each end button is released, since the piston seal then does not interfere with the return flow of atmospheric air into the chamber.

Figure 12:
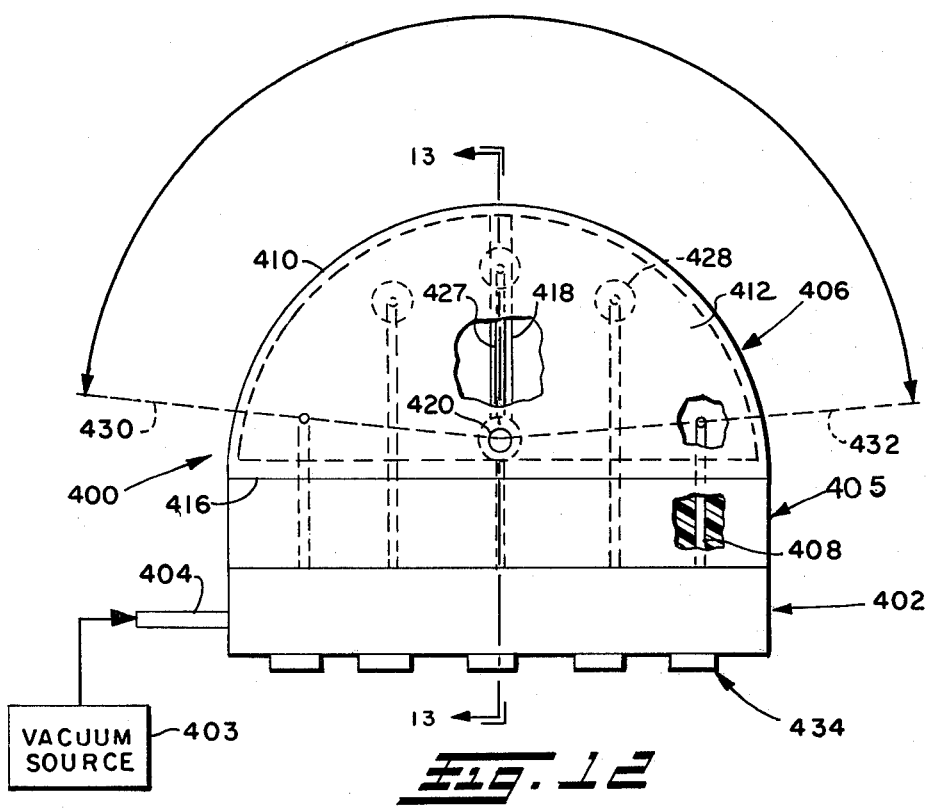
FIG. 12 is a top view of a pushbutton actuated pneumatically operated rotary actuator having portions of the housing broken away to show the movable piston member and fluid passageways.

Referring now to FIG. 12, the invention is shown as embodying an alternate form of a pushbutton actuated pneumatically operated actuator indicated generally at 400 and having a pushbutton control panel indicated generally at 402. A vacuum source 403 communicates through a port 404, with a manifold member 405 and a rotary pneumatic actuator indicated generally at 406.

The internal construction of pushbutton control panel 402 is identical in structure and function to the embodiments previously described above and shown with reference to FIGS. 1, 3 and 4.

Referring to FIG. 13, manifold member 405 has formed therein a plurality of spaced fluid passageways 408 for fluidly connecting the outlet of each pushbutton valve assembly to the piston chamber.

Actuator 406 includes a housing 410 which defines a fluid chamber 412. An end plate 416 is sealingly connected to the open end of housing 410 and functions to close off chamber 412 from the atmosphere. A plurality of fluid ports 417 extend through the wall of housing 410 and communicate each passageway 408 with chamber 412.

A rotatable piston or flapper member 418 formed of a suitable resilient material such as plastic is pivotally mounted to the wall of housing 410 for pivotal movement therein and is secured therein by means of an output pin 420 which is rotatably received in housing mounting holes 422 and 424. Pin 420 is pressed into an opening 426 which is preferably integrally molded through the pivot end of flapper 418. In the presently preferred practice a groove is formed in the periphery of flapper 418 and a seal 427 is seated therein and is in sealing engagement with the internal wall of housing 410.

In the preferred practice of the invention a one-way check valve 428 is located along each of the three intermediate interconnecting passageways 408 and functions, as described above, to prevent excessive atmospheric air from venting into chamber 412.

The principle of operation of pushbutton controlled pneumatic actuator 400 is similar to that of the actuator having a linear output as described above with reference to FIGS. 1, 3 and 4. Upon the operator depressing one of pushbuttons 434, the associated valve therein causes a portion of chamber 412 on one side of flapper 418 to be communicated with vacuum source 403. A pressure differential is thereby created across flapper 418 which causes it to rotate toward the orifice of the fluid port 417 through which atmospheric air has been vented. The flapper 418 will continue to rotate until seal 427 blocks off the orifice of port 417. In this null position the atmospheric air vented through port 417 in line with line 432 equalizes the air pressure on either side of the flapper which places it in static equilibrium.

In the embodiment shown by FIG. 12, actuator 406 can produce a rotational output having a total angular displacement equivalent to the angle between lines 430 and 432 which, in the presently preferred practice, subtends a central angle of at least 170 degrees. The rotational output of pin 420 can be used to actuate associated heating and air conditioning system components and control functions.

It should be noted that an alternate embodiment of the invention could be constructed in which pressurized air above atmospheric air pressure is supplied to the chamber on either side of the piston. Pushbutton vent valves are fluidly connected to the piston chamber by means of spaced passageways comparable to ports 104–110 and 68 of FIG. 3. The actuator is operated by depressing one of the pushbutton vent valves which vents the pressurized air in the chamber to the atmosphere. The piston will then be moved by the differential pressure across the piston until the piston seal aligns over and blocks further venting in a manner similar to that described above. The pushbutton vent valves would function in the closed position to prevent air flow from the chamber and in the open position to vent the pressurized air in the chamber.

In the present invention the pushbutton actuated pneumatic actuator thus far described is employed in an automatic temperature control system which incorporates both pneumatically and electrically operated components. As shown by FIGS. 3, 6, and 7, the output of pneumatic actuator 42 is used to position both a vacuum and electrical programmer for distributing various pneumatic and electrical signals for a given mode of system operation. For the system control panel arrangement of FIG. 1, four pushbutton actuated pneumatic actuators would be required: one for pushbuttons 20, 22, and 24 for controlling blower speed with the output piston connected to only an electrical programmer; a second for pushbuttons 26, 28, 30, 32, and 34 for controlling system operating modes with the output piston connected to an electrical and vacuum programmer arrangement as shown by FIGS. 3, 6, and 7; a third for pushbuttons 36 and 38 with the output piston connected only to an electrical programmer for controlling rear window blower speed; and, a fourth for pushbuttons 14 and 16 for selecting a set-point temperature with the output piston operably connected to an automatic temperature control sensor.

The pushbutton actuated pneumatic actuator will now be described in association with the presently preferred temperature control systems of the invention.

Referring now to FIG. 8, there is shown an automatic temperature control (ATC) sensor indicated generally by reference numeral 156 having a regulator valve assembly indicated generally at 158 and a set-point temperature pneumatic actuator indicated generally by reference numeral 160. ATC sensor 156 is of a known type for use in passenger vehicle temperature control systems as will be described subsequently. Regulator 158 is shown and described in detail in my copending U.S. patent application Ser. No. 897,604 filed Apr. 18, 1978, now U.S. Pat. No. 4,245,780 issued Jan. 20, 1981, and assigned to the assignee of the present application. Regulator 158 includes a converging aspirator inlet 162, a temperature sensitive bimetallic element 164, a fluid pressure modulator valve means indicated generally at 166, and a bias spring 168. The lower end of bias spring 168 is connected to an element of modulator valve 166 and its upper end is connected to an output control rod 170 of pneumatic actuator 160. By forcing ambient air into inlet 162 and through outlet 163, in-car air is aspirated upwardly around bimetal 164 as shown by the black arrows. The temperature of the aspirated air causes bimetal 164 to deflect either upwardly or downwardly, and in combination with the load of bias spring 168, adjusts modulator valve means 166.

A vacuum source, not shown, is communicated to fluid port 172 where it is then modulated by valve assembly 166 and communicated through outlet port 174. The modulated vacuum signal from port 174, identified also as a control signal, is communicated to vacuum motors, not shown, which operate associated heating and air conditioning control devices, for example, heater core water valves and blend doors which modulate the flow of heated and cooled air through the system ductwork. In the above identified copending application, the teachings of which are incorporated by reference herein, the control signal from port 174 is connected to a vacuum motor which positions a linearly movable valve member against a plurality of outlet ports resulting in a variety of modulated vacuum signals to various associated system components as described above.

Pneumatic actuator 160 includes a housing 178 which defines a cylindrical chamber 180, a first fluid port 182, and a second fluid port 184, both of which are in fluid communication with chamber 180. A piston 185 is slidably received in chamber 180 and in sealing engagement therewith by means of a piston seal 186. Control rod 170 is connected to piston 185 and is slidably received through openings 187 and 188 located respectively at opposite ends of housing 178. Seal rings 190 and 192 are received over control rod 170 and mounted in corresponding counterbores in housing 178 adjacent openings 187 and 188 and function to fluidly isolate chamber 180. A fluid line 194 is connected at one end to fluid port 182 and at the other end (not shown) to one outlet passageway of a two-pushbutton pneumatic actuator arrangement, for example nipple 60 of FIG. 1. A second fluid line 196 is connected at one end to fluid port 184 and at the other end (not shown) to the other outlet of the two-pushbutton actuator, for example nipple 56 of FIG. 1.

An electrical transducer and associated circuitry (not shown) is connected to the free end of control rod 170 and has an electrical output signal proportional to the position of control rod 170 which is transmitted to display 18 preferably in the form of a digital output.

With continued reference to FIG. 8 the operator can raise or lower the desired set-point temperature input to regulator 158 by depressing either pushbutton 16 or 14. Upon depressing one of the pushbuttons, a vacuum signal is communicated to the space on one side of piston 185 resulting in a differential pressure which moves the piston. Movement of piston 185 and control rod 170 causes the load on bias spring 168 to vary which, in cooperation with the force developed by bimetal element 164 causes a valve element within modulator valve 166 to be positioned for producing a specific pneumatic signal. If the in-car temperature is not equivalent to the selected set-point temperature, then modulator valve 166 will transmit a pneumatic signal to an associated vacuum motor which will position a temperature adjusting air blend door. The resultant position of piston 185 along chamber 180 is a function of how long the operator holds down pushbutton 14 or 16. As soon as the operator releases either pushbutton, indicative that the temperature reading on display 18 is at the desired value, piston movement is prevented, by the frictional force of seal rings 190 and 102 contacting control rod 170 and the frictional drag of piston seal 186 against the internal wall of chamber 180.

Referring now to FIG. 9, there is shown a schematic representation of an automotive heating and air conditioning system which incorporates a pushbutton actuated pneumatically operated actuator of the type described in detail above. The invention system includes a two-pushbutton temperature selector indicated generally at 194 having a HOT pushbutton 196, a positional temperature indicator element 198, and a COLD pushbutton 200. A vacuum source 202 taken from any convenient source such as the engine intake manifold, not shown, is fluidly connected to selector 194 by a fluid line 204.

The pneumatic control signals from both HOT pushbutton 196 and COLD pushbutton 200 are communicated to a pneumatic actuator 206 by fluid lines 208 and 210, respectively. Fluid lines 208 and 210 are comparable in function to fluid passageway 66 of FIG. 3. Selector 194 incorporates only two pushbuttons and functions in a manner similar to pneumatic actuator 160 of FIG. 8. The output control rod from pneumatic actuator 206, is shown schematically at 212 as being connected to a blend door 214 which is pivotally mounted in an air duct 216.

A heater core 218 for transferring heat to air flowing through duct 216 receives heated fluid from an engine cooling system 219 through a fluid line 221. Air blend door 214 is movable between a first position, shown by the solid lines in FIG. 9, in which air is deflected away from heater core 218, and a second position, shown by dashed lines in FIG. 9, in which all of the air flowing through the duct flows against the heater core. Also mounted in duct 216 is an evaporator core 220 connected by means of a fluid line 222 to a refrigeration unit 224. The black arrows at either end of duct 216 indicate the direction of air flow through the duct as forced by a blower 226 connected at the inlet end of duct 216.

In the presently preferred practice, the invention as embodied in the semiautomatic system of FIG. 9 is operated by manually depressing either HOT pushbutton 196 or COLD pushbutton 200 until indicator 198 is moved to the desired position. The resultant position of indicator 198 is determined by whether or not the temperature of the passenger compartment requires heating or cooling as perceived by the operator. The position of indicator 198 along the display is proportional to movement of blend door 214. Maximum cold air discharge to the passenger compartment is attained by pressing the COLD pushbutton until the indicator has moved entirely to the right end of the display which corresponds to blend door movement to the position shown by the solid lines of FIG. 9. Maximum temperature discharge air to the passenger compartment is attained by similarly depressing the HOT pushbutton until indicator 198 has moved to its leftwardmost position which results in blend door 214 being moved to the position shown by the dashed lines of FIG. 9 in which all of the air passing through duct 216 flows over heater core 218 allowing for maximum heat transfer to air being discharged to the passenger compartment.

Referring now to FIG. 10, there is shown an alternate embodiment of the invention in the form of an automatic temperature control system incorporating an ATC sensor which provides a modulated vacuum signal to automatically regulate the flow of heated and cooled air to maintain passenger compartment temperature. The system of FIG. 10 comprises a pushbutton control panel indicated generally at reference numeral 228 having a temperature increase button 230, a temperature readout display 232 and a temperature decrease button 234. Pushbuttons 230 and 234 each form part of a pushbutton actuated pneumatic actuator valve structure similar to that described above and illustrated by FIGS. 4 and 5. Outlet fluid lines 236 and 238 associated with pushbuttons 230 and 234 respectively, communicate a vacuum signal to a pneumatic actuator 240. The positions of fluid lines 236 and 238 relative to pneumatic actuator 240 are similar to actuator 160 as illustrated by FIG. 8.

An engine vacuum source 242 is communicated to pushbutton selector 228 by a fluid line 244 and also to an automatic temperature control sensor 246 by a fluid line 248. Sensor 246 and actuator 240 are similar in structure to the embodiment illustrated by FIG. 8.

Automatic temperature control sensor 246 produces an output control signal which is communicated by means of a fluid line 250 to a vacuum motor 252. The output of vacuum motor 252 is connected to a blend door 254 which is rotatably mounted within an air duct 256. Mounted within duct 256 is a heater core 258 which is heated by engine coolant which flows through a fluid line 260 from an engine cooling system 262. A refrigeration unit 264 is provided for cooling air and includes a fluid line 266 for communicating a liquid cooling medium to an evaporator core 268 mounted within duct 256. An electrically driven blower 270 is mounted adjacent the inlet end of the duct and functions to convey fresh ambient air or recirculated air through the duct and eventually to the passenger compartment. Blend door 254 is movable between a first position as shown by the solid lines of FIG. 10 and a second position as represented by the dashed lines for proportioning air flow in the duct over the heater core 258 for modulating the temperature of the duct air. The system of FIG. 10 also includes a fail safe switch 272 which is in fluid communication with vacuum motor 252 by means of a fluid line 274 and also engine vacuum source 242 by means of a fluid line 276.

Figure 11:
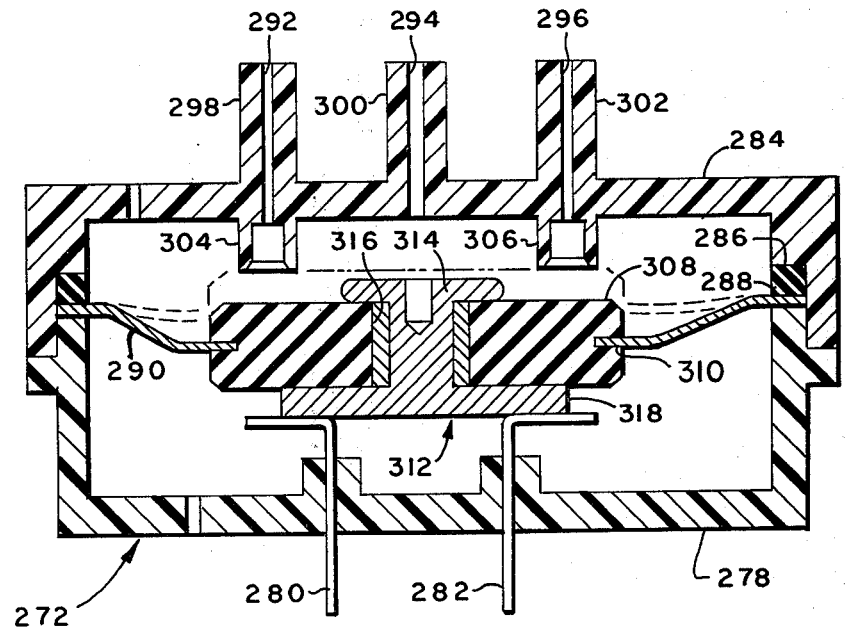
FIG. 11 is an enlarged cross-sectional view of the electropneumatic fail safe switch employed in the embodiment of FIG. 10.

Referring now to FIG. 11, fail safe switch 272 is shown as comprising a lower housing member 278 preferably formed of insulating material and having extending therethrough and externally thereof a pair of switch contacts 280 and 282. An upper housing member 284 is connected to lower housing 278 and sealed at the junction thereof by means of a seal 288 seated against a shoulder 286 in upper housing 284. A preferably annular spring 290 is clamped between seal 288 and lower housing 278 around its outer periphery. A series of fluid ports 292, 294, and 296 are defined by nipples 298, 300, and 302, respectively, which extend upwardly in FIG. 11 from the top surface of upper housing 284. Extensions 304 and 306 are formed on the underside of the upper housing 284 respectively for ports 292 and 296 and extend into the internal chamber defined by the upper housing member. An insert 308 formed of an insulating material has a slot 310 formed into its outer peripheral surface with the inner periphery of spring 290 received therein to resiliently suspend the insert in the housing chamber. An electrical contact member indicated generally at 312 has a lower flanged portion 318 and an upper cylindrical portion 314 which is received through a central opening 316 in insert 308. The lower face of flange 318 has its outer diameter of a size to insure electrical contact with contacts 280 and 282. Contact member 312 is secured to insert 308 by riveting the upper end of cylindrical portion 314 outward radially over the top surface of the insert.

During normal operation of the system of FIG. 10, a vacuum source is communicated to the space between spring 290 and upper housing member 284 through nipple 294 which causes spring 290 to be deflected upwardly to the position indicated by dashed lines in FIG. 11 until the lower surfaces of extensions 304 and 306 sealing engage with the upper surface of insert 308 and switch contacts 280 and 282 are placed in an open position.

If there is a failure of system vacuum, spring 290 will move insert 308 downwardly causing contact member 312 to close the circuit between contacts 280 and 282 as shown in solid outline in FIG. 11 and also placing fluid ports 292 and 296 into a vented condition with atmospheirc air pressure. As shown by FIG. 10, fail safe switch 272 has an output fluid line 274 connected to vacuum motor 252. The other end of fluid line 274 can be connected to either nipple 298 or 302. The other nipple is made available if the system has a defrost blend door. Loss of system vacuum would vent a vacuum motor (not shown) connected to the defrost blend door which would move the defrost blend door to a maximum defrost air flow position.

During any system vacuum loss, the venting of atmospheric air to vacuum motor 252 causes it to move blend door 254 to the dashed line position of FIG. 10 which results in maximum temperature discharge air flow to the passenger compartment. Simultaneously, the closing of switch contacts 280 and 282 causes blower 270 to be placed at maximum operating speed, thus insuring that sufficient hot air flow is available if ambient temperatures are at dangerously low levels.

The invention, as embodied in the system of FIG. 10, is operated by first depressing either temperature increase button 230 or temperature decrease button 234 and holding the button in an actuated position until the desired temperature appears on temperature display 232. During the time that either pushbutton has been depressed, a vacuum signal has been communicated to pneumatic actuator 240 which causes it to move to a position which is proportional to the desired set point temperature. The output from the pneumatic actuator piston is connected to a biasing spring in automatic temperature control sensor 246. Pneumatic actuator 240 and automatic temperature control sensor 246 are of the type illustrated in FIG. 8 and have been described in detail above. The output signal from ATC sensor 246 is communicated to vacuum motor 252 as described above whereupon blend door 54 is moved to a position within air duct 256 for deflecting an appropriate proportional amount of the total air flow through duct 256 toward heater core 258 if heating is required. If the temperature sensed by ATC 246 is above the selected set-point temperature the blend door is moved to a position shown by the solid lines of FIG. 10 thus resulting in no flow over heater core 258 and a flow of only cooled air from evaporator 268 to the passenger compartment. If the in-car temperature suddenly changes, the automatic temperature control system will automatically adjust the position of blend door 254 to compensate for the temperature change and blended heated and cooled air will be discharged to the passenger compartment until the in-car temperature is equivalent to the selected or set-point temperature.

Other embodiments and variations of this invention will occur to those skilled in the art and which are within the scope of the following claims.

What is claimed is:

1. A pushbutton actuated pneumatically operated actuator, said actuator comprising:
 (a) body means, said body means defining
  (i) a fluid chamber, and
  (ii) a plurality of spaced fluid outlet ports extending through a wall of said body means and in fluid communication with said chamber, with each of said ports connected to an associated outlet fluid passageway, said passageways being adapted for connection to a fluid pressure sink, said plurality of fluid ports including at least one intermediate fluid port and two outermost fluid ports on either side of said intermediate fluid port;
 (b) piston means slidably received in said chamber, said piston means including seal means located around the periphery thereof and in generally sealing engagement with said outlet fluid passageways;
 (c) inlet means for communicating fluid pressure into said chamber on opposite sides of said piston seal means;
 (d) valve means disposed in each of at least three of said passageways, said valve means each having a valve member adapted for selective actuation and movable between a normally closed position in which said passageway is isolated from said fluid outlet port and an open position in which said passageway communicates with said fluid outlet port, said valve means in said open position permitting fluid in said passageway to escape therefrom at a flow rate substantially greater than said inlet port means permits fluid to enter said passageway, said piston means movable upon actuation of one of said valve means to a position in which said seal means straddles said outlet port and substantially prevents further fluid flow to said outlet passageway;
 (e) said inlet means is defined by a vent passage in each of said valve members, said valve means in fluid communication with said outermost fluid ports, said vent passage closed upon said valve means being actuated to said open position; and (f) check valve means disposed intermediate said valve means and said at least one intermediate fluid port, said check valve means preventing atmospheric air from venting into said passageway through said intermediate fluid port.

2. A pushbutton controlled pneumatic actuator comprising:

a housing defining a fluid chamber;

a plurality of spaced fluid outlet ports communicating said chamber with a plurality of associated outlet fluid passageways, each said outlet passageway adapted for connection to a fluid pressure sink;

piston means disposed for selective displacement within said chamber and including a peripheral seal for overlaying said ports as a function of said displacement to selectively interrupt said communication;

vent means for providing atmospheric fluid pressure into said chamber on opposite sides of said seal; and valve means in fluid connection with each of said outlet passageways, each said valve means being selectively operable to fluidly isolate its associated fluid port and passageway in a normally closed position and to restore said communication in an open position to permit fluid in said associated passageway to escape therefrom at a rate substantially greater than the rate at which said vent means permits fluid to enter said chamber, said vent means being fluidly interconnected with said chamber through at least one of said valve means which is further operative to selectively interrupt said fluid interconnection.

* * * * *